(12) United States Patent
Knieriem et al.

(10) Patent No.: US 8,313,067 B2
(45) Date of Patent: Nov. 20, 2012

(54) POLE SHAFT COUPLING ASSEMBLY AND RELATED METHOD

(75) Inventors: Alan S. Knieriem, Baldwinsville, NY (US); Thaddeus J. Wawro, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 111 days.

(21) Appl. No.: 12/638,362

(22) Filed: Dec. 15, 2009

(65) Prior Publication Data

US 2011/0140379 A1 Jun. 16, 2011

(51) Int. Cl.
*A47K 1/04* (2006.01)

(52) U.S. Cl. ............ 248/129; 248/161; 248/188.7; 403/359.1

(58) Field of Classification Search .......... 248/161, 248/157, 129, 188.7; 601/41; 403/361, 359.1
See application file for complete search history.

(56) References Cited

U.S. PATENT DOCUMENTS

| | | | | | |
|---|---|---|---|---|---|
| 595,789 | A | * | 12/1897 | Smith | 256/26 |
| 659,123 | A | * | 10/1900 | Bies | 74/551.4 |
| 2,574,648 | A | | 11/1951 | Mason | |
| 2,678,226 | A | | 5/1954 | Wright | |
| 2,990,205 | A | * | 6/1961 | Weisser | 403/42 |
| 3,279,835 | A | * | 10/1966 | Krohm | 403/326 |
| 3,503,639 | A | | 3/1970 | Taylor | |
| 3,531,144 | A | | 9/1970 | Bizilia | |
| 3,588,154 | A | * | 6/1971 | Voight et al. | 403/300 |
| 3,891,175 | A | * | 6/1975 | Hawley et al. | 248/317 |
| 4,152,086 | A | | 5/1979 | Achenbach et al. | |
| 4,236,609 | A | * | 12/1980 | Carlsson | 188/67 |
| 4,506,408 | A | * | 3/1985 | Brown | 16/225 |
| 4,525,099 | A | | 6/1985 | Day | |
| 4,725,027 | A | * | 2/1988 | Bekanich | 248/125.8 |
| 4,744,536 | A | * | 5/1988 | Bancalari | 248/125.8 |
| 4,810,144 | A | | 3/1989 | Martelli | |
| 4,819,402 | A | * | 4/1989 | Schneider | 52/848 |
| 4,877,164 | A | * | 10/1989 | Baucom | 224/544 |
| 5,066,162 | A | * | 11/1991 | Wall et al. | 403/361 |
| 5,109,572 | A | * | 5/1992 | Park | 16/334 |
| 5,582,488 | A | * | 12/1996 | Dudley et al. | 403/103 |
| 5,688,067 | A | | 11/1997 | Straub | |
| 5,689,860 | A | | 11/1997 | Matoba et al. | |
| 5,692,856 | A | * | 12/1997 | Newman et al. | 403/352 |
| 5,816,113 | A | * | 10/1998 | Fohl | 74/552 |
| 5,820,086 | A | * | 10/1998 | Hoftman et al. | 248/125.2 |
| 5,899,036 | A | | 5/1999 | Seiber et al. | |
| 5,993,283 | A | | 11/1999 | Cyrus et al. | |
| 6,263,543 | B1 | * | 7/2001 | Daoud | 16/342 |
| 6,343,568 | B1 | | 2/2002 | McClasky | |
| 6,390,925 | B1 | * | 5/2002 | Perrow | 464/111 |
| 6,612,534 | B2 | * | 9/2003 | Hennessey | 248/519 |
| 6,705,949 | B2 | * | 3/2004 | Glowacki et al. | 464/183 |
| 6,865,776 | B2 | * | 3/2005 | Spinelli | 16/110.1 |
| 7,077,027 | B2 | | 7/2006 | Krizan et al. | |
| 7,222,395 | B2 | * | 5/2007 | Vackar | 16/330 |
| 7,325,601 | B2 | | 2/2008 | Mack et al. | |
| 7,367,740 | B2 | * | 5/2008 | Lazic et al. | 403/97 |

(Continued)

*Primary Examiner* — Bradley Duckworth

(57) ABSTRACT

A pole member for a stand, such as a medical stand, is defined by a first pole section and a second pole section. The first pole section includes a hollow end having a spline disposed therein for engaging a corresponding spline formed on a mating end of the second pole section. The splines are sized to interconnect wherein each spline includes tapering teeth and slots to create locking engagement therebetween and limit lateral play. A locking element engages the hollow end of the first pole section when inserted a predetermined distance therein.

7 Claims, 3 Drawing Sheets

U.S. PATENT DOCUMENTS

| | | | |
|---|---|---|---|
| 7,445,242 B2 * | 11/2008 | Yamaguchi et al. | 280/780 |
| 7,497,407 B2 * | 3/2009 | Blankenship et al. | 248/129 |
| 7,624,953 B2 * | 12/2009 | Silverman et al. | 248/125.1 |
| 7,665,185 B2 * | 2/2010 | Vackar | 16/330 |
| 7,736,083 B2 * | 6/2010 | Lescure et al. | 403/359.1 |
| 7,828,253 B2 * | 11/2010 | Meyer | 248/129 |
| 7,896,298 B2 * | 3/2011 | Meyers et al. | 248/125.8 |
| 2002/0096608 A1 * | 7/2002 | Cedarberg, III | 248/125.3 |
| 2002/0158177 A1 * | 10/2002 | Hill | 248/354.5 |
| 2005/0139736 A1 * | 6/2005 | Breda et al. | 248/129 |
| 2005/0258320 A1 * | 11/2005 | Edwards et al. | 248/188.7 |
| 2006/0147256 A1 | 7/2006 | Richardson et al. | |
| 2009/0200441 A1 * | 8/2009 | Kuhn et al. | 248/206.5 |
| 2009/0208283 A1 * | 8/2009 | Rankin | 403/359.1 |
| 2010/0232874 A1 * | 9/2010 | Bjoerck et al. | 403/359.1 |

* cited by examiner

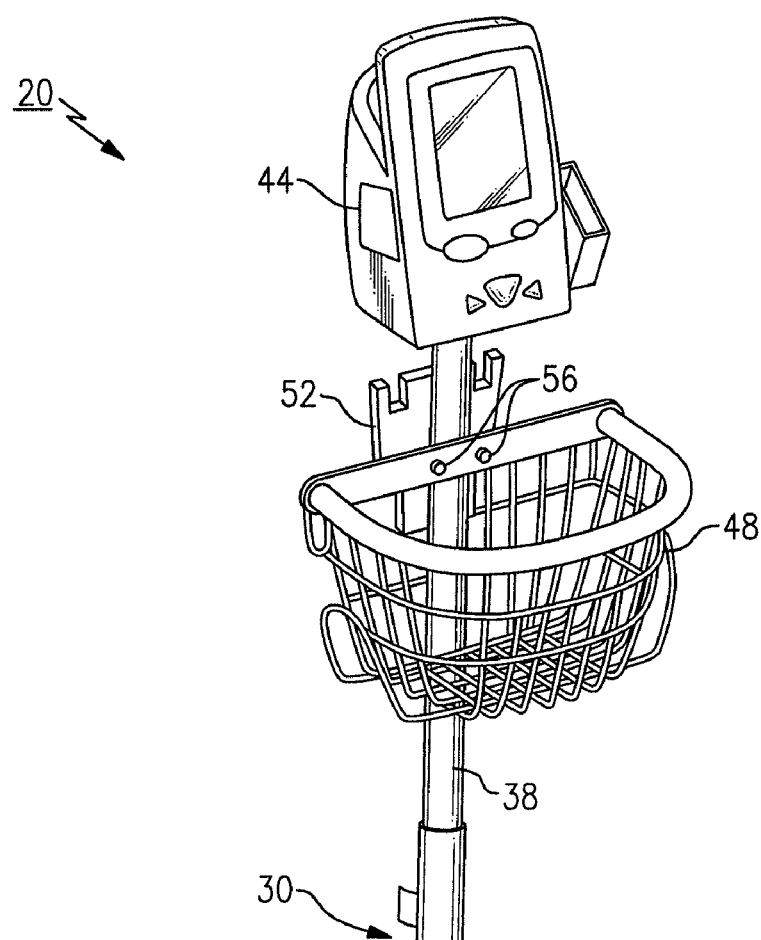
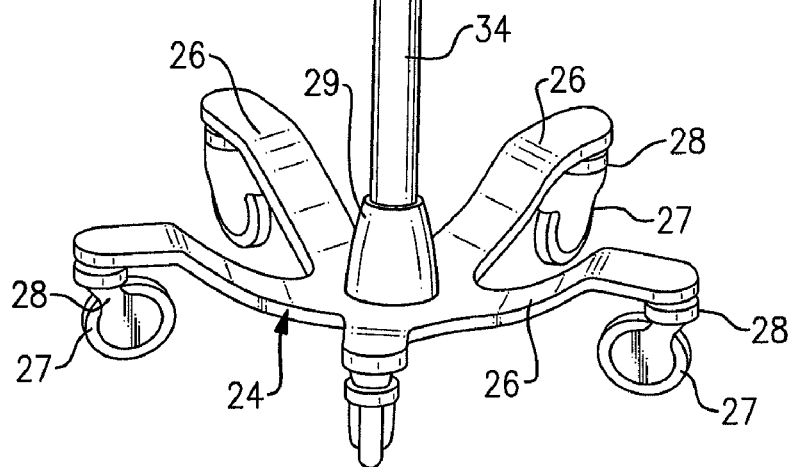
FIG. 1

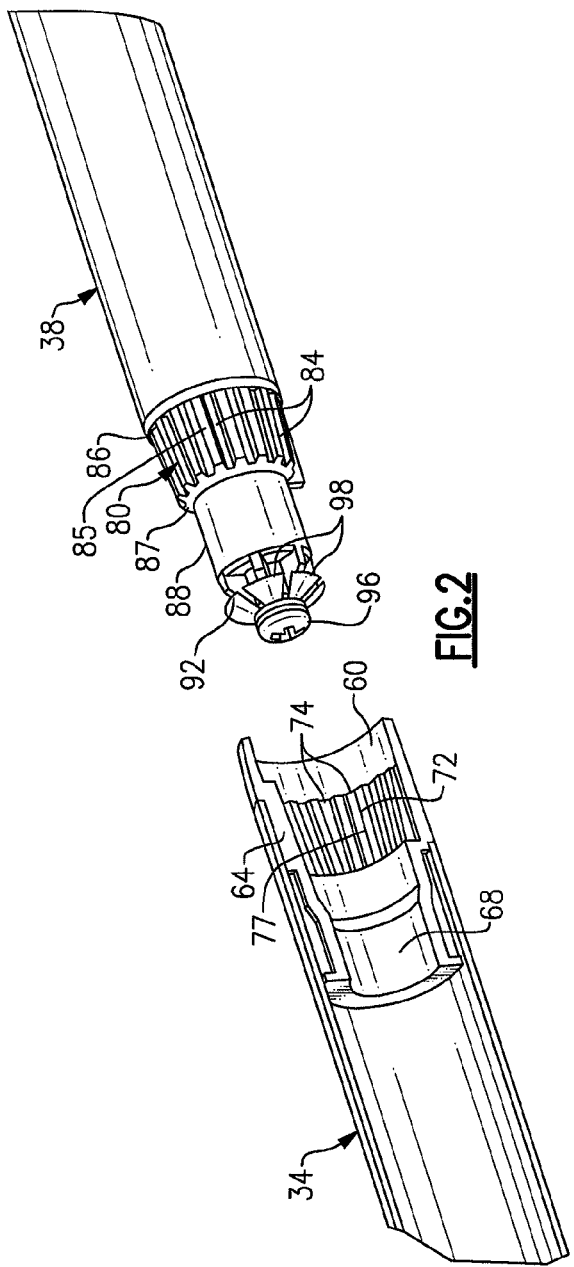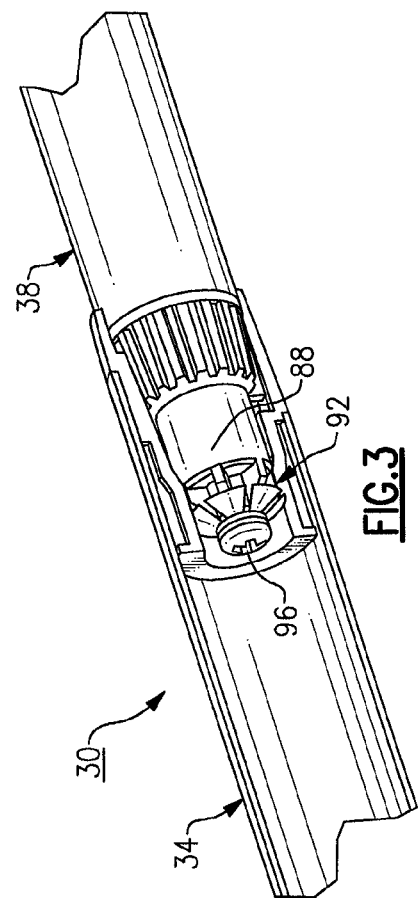

POLE SHAFT COUPLING ASSEMBLY AND RELATED METHOD

FIELD OF THE INVENTION

The application relates generally to the field of assembled articles and more specifically to a coupling assembly for assembled articles, such as a supporting pole assembly for a medical mobile stand.

BACKGROUND OF THE INVENTION

Many articles are shipped to their end destinations in a fully assembled condition. Shipping containers for these articles therefore must be quite large; particularly for assemblies that are defined by relatively long or bulky portions. To ease shipability, some articles are transported in component or part form wherein final assembly is completed by an end user. Certain of these articles, such as stands and the like that include posts or poles among their component parts, are among such assemblies that could be shipped in a partially assembled state. In some versions, these poles are made to be telescopic to aid in assembly or in permitting adjustability using a smaller initial footprint. A competing issue exists, however, in that some assemblies may also have stability requirements. It is still a desire to be able to ship or initially store such articles in order to decrease the size of their respective shipping container, but yet permit dependable secure assembly of the discrete components, for example, in a permanent structure.

SUMMARY OF THE INVENTION

Therefore and according to one aspect, there is provided a support assembly comprising a pair of interlocking pole members; namely, a first pole member having a hollow end with a female spline disposed therein for mating engagement with a male spline formed at the end of a second pole member. The engaging teeth of the male and female splines combine to define an interface that directly and permanently engages the pole members and minimizes lateral play. In one version, the teeth are angled to create an interference fit.

In one version, the hollow end of the first pole member includes a contoured mating hole sized to receive an extending portion of the second pole member.

In another version, a concave washer with a serrated edge or other locking element engages the hollow end of said first pole member when the second pole member is inserted a predetermined distance into the hollow end of the first pole member.

According to one version, the teeth and the slots of the respective splines are tapered but in which the teeth of the male spline are larger than the corresponding tapered slots of the female spline, thereby producing line contact and a stable and secure interconnection.

According to another aspect, there is provided a mobile stand, said mobile stand comprising a wheeled base and a vertically extending pole member in which each of the pole member and wheeled base are interconnected, the pole member having a first spline and the wheeled base having an extending mating section that includes a second spline. The first and second splines interface to form a permanent connection. The vertically extending pole member can be made from two or more separate and interlocking sections, each of the interlocking sections being defined by respective mating ends.

The interlocking sections are defined by a first pole section having a hollow end with a female spline disposed therein for mating engagement with a male spline formed at the end of a second pole section. The engaging teeth of the male and female splines combine to define an interface that directly and permanently engages the pole sections and minimizes lateral play. In one version, the teeth are angled to create an interference fit.

According to yet another aspect, there is described a method for manufacturing a pole assembly, said method including the steps of providing a first pole section with a hollow first end having a first spline, providing a second pole section having a first end and providing a second spline complementary to said first spline at said end. One of said splines of the first and second poles includes a plurality of axial teeth and the other of said splines includes a plurality of slots, each of said slots being sized to receive said teeth in an interference fit.

An advantage is that sturdy, stable and reliable assembly is made possible using the herein described stand, while still permitting portions thereof to be shipped as component parts.

Another advantage is that the assembly process is relatively easy, while still being permanent and secure.

These and other features and advantages will be readily apparent from the following Detailed Description, which should be read in conjunction with the accompanying drawings.

BRIEF DESCRIPTION OF THE DRAWINGS

FIG. 1 is a front perspective view of a mobile stand including a pole assembly made in accordance with an exemplary embodiment of the present invention;

FIG. 2 is an assembly view of the pole assembly, partly in section used in the mobile stand depicted in FIG. 1;

FIG. 3 is an assembled view of the pole assembly of FIG. 2, shown in section.

DETAILED DESCRIPTION

Figure 4:
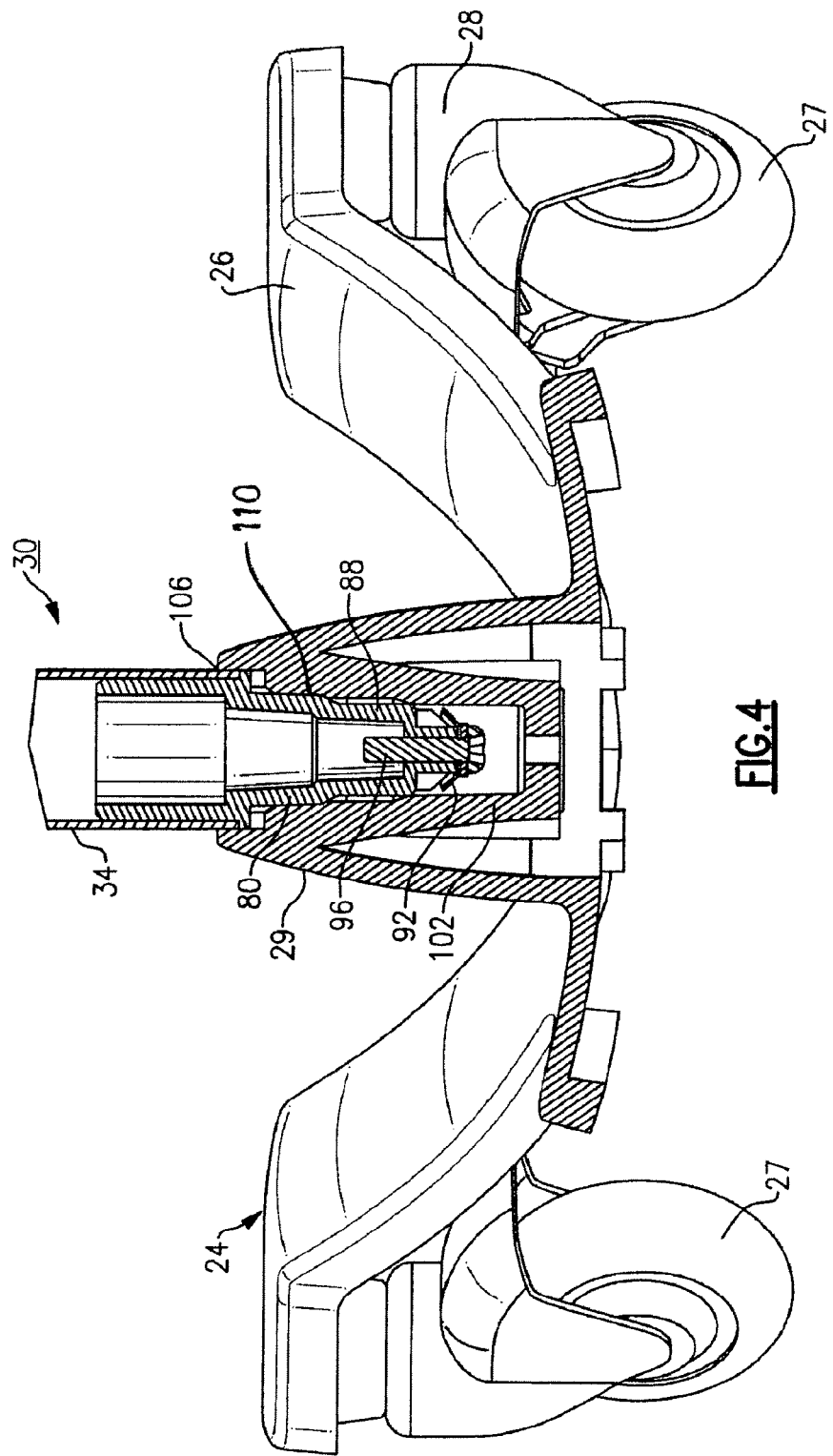
FIG. 4 is a sectioned partial side elevational view illustrating the interconnection of a pole member to the wheeled base of the mobile stand of FIG. 1.

The following description relates to an exemplary mobile stand depicting salient features of the present invention. More specifically, the mobile stand includes a pole assembly made in accordance with the inventive concepts defined herein. It will be readily apparent, however, that various modifications and/or changes could be made within the intended scope of the concepts that are described herein. In addition, certain terms such as "upper", "lower", "distal", "proximal", "above", "below" and the like are used throughout the course of this description in order to provide a convenient frame of reference with regard to the accompanying drawings. These terms, however, are merely intended to provide clarity and not to narrow the scope of the claimed invention, except where so specifically indicated.

Referring to FIG. 1, there is shown a mobile stand 20 defined in accordance with an exemplary embodiment. The mobile stand 20 is defined by a wheeled base 24, which includes a plurality of wheels 27 extending from the bottom of a set of base legs 26, the wheels being rotatably secured thereto by casters 28 or other suitable means. In this version, five (5) base legs and wheels are shown, although this parameter can be easily and suitably varied. The base 24 further includes a center stanchion or post 29 having a hollow end 100 that is sized to receive one end of a support pole member 30. As described herein, the support pole member 30 is made of a pair of interlocking pole sections; namely a lower pole section 34 and an upper pole section 38 that are assembled together into a unitary member, as a subassembly.

A medical instrument, such as a vital signs monitoring device 44, (such as a SPOT ULTRA monitoring device sold by Welch Allyn, Inc. of Skaneateles Falls, N.Y.), is attached by known means to the upper end of the upper pole section 38 in addition to other hardware, including a support basket 48. The herein shown vital signs monitoring device 44 is configured to measure various physiological parameters of a patient (not shown) including, but not limited to body temperature, blood pressure, respiration, pulse rate and blood oxygen saturation (pulse oximetry). Other instruments/devices can be used depending on the application, wherein the instrument shown is herein intended to be merely exemplary. The support basket 48 is secured to the upper pole section 38 by means of a bracket 52, which is attached to the exterior of the upper pole section by a set of fasteners 56 or other convenient means. Alternatively, the support basket 48 could be made integral with the upper pole member 38. The support basket 48 according to this embodiment is used to conveniently store accessories (not shown) for the attached monitoring device 44, such as thermometry probe covers, inflatable blood pressure cuffs and the like. Other suitable storage or securing means such as hooks can also be provided, depending on, for example, the instrument and application of the mobile stand 20.

The mating interface of the two interlocking pole sections 34, 38 of the pole member 30 according to this exemplary embodiment is now described in greater detail with reference to FIGS. 2 and 3.

According to this embodiment, the upper end of the lower pole section 34 is hollow and includes a contoured female mating hole or opening 60, which further includes an insert section 64, the diameter of the mating hole being narrowed at a lower end 68 of the insert section. A female spline 72 is formed within an axial portion of the insert section 64 proximate the opening 60. The female spline 72 is defined by a series of axially extending slots 74 disposed about the inner circumference of the insert section 64 proximate the hollow upper end of the lower pole section 34. Each of the slots 74 taper inwardly from a larger width dimension adjacent the opening 60 to a narrower width dimension at a bottom end. Each slot 74 is bounded by a sidewall projecting radially from the spline 72, the slots being separated from one another by annular sections 77.

Still referring to FIGS. 2 and 3, the lower end of the upper pole section 38 includes mating features that are complimentary to those provided in the lower pole section 34. To that end and according to this exemplary embodiment, a male spline 80 is provided at the lower end along an axial portion of the pole section 38. The male spline 80 is defined by a plurality of axially extending teeth 84 formed about the entire outer circumference of the upper pole section 38. The teeth 84 extend axially; that is, in a direction that is parallel with the primary axis of the upper pole section 38 wherein each tooth preferably includes a pair of sidewalls that taper outwardly from a distal end 87 to a proximal end 86 of each tooth. The outward taper of the teeth 84 of the male spline 80 is slightly larger than the taper defined by the slots 74 of the female spline 72. The teeth 84 are equally spaced about the circumference of the axial portion of the upper pole section 38, each of the teeth being separated by annular sections 85.

Coextensive with the lower end of the upper pole section 38 is an extending cylindrical section 88 that is distally arranged relative to the male spline 80. The extending cylindrical section 88 extends over an axial section of the pole section 38 and has a diameter that is narrower than the outer diameter of either spline 72, 80. The cylindrical section 88 includes a distal section having a center opening (not shown), aligned along the primary axis of the pole section 38. This center opening according to this embodiment is threaded and configured to receive a fastener 96. The fastener 96 is used to secure a locking washer 92 to the distal end section of the upper pole section 38. The locking washer 92 is defined by a concave shape, including a plurality of serrated portions 98 that are circumferentially disposed.

When the lower and upper pole sections 34, 38 are assembled together as shown in FIG. 3, the extending cylindrical portion 88 of the upper pole section 38 is sized to fit within the opening 60 of the insert section 64 and be advanced axially into the lower portion 68 thereof. As the upper pole section 38 is advanced axially, the teeth 84 of the male spline 80 engage the tapered slots 74 of the female spline 72 without interference between the annular sections 77, 85. The male and female splines 72, 80 defined herein together define a mating interface such that when the teeth 84 of the male spline 80 engage the slots 74 of the female spline 72, the outward taper of the male teeth 84 being slightly larger than that of the slots 74 of the female spline 72 creates line-contact made between each mating tooth. As engagement increases axially, coupler material is slightly displaced to create surface to surface contact, which increases overall interface effectiveness.

The foregoing interface between the engaging splines 72, 80 of the engaged pole sections limits lateral play as well as radial motion between the mating upper and lower pole sections 34, 38. In addition, a diametrical interface is provided between the extending cylindrical portion 88 and the mating hole 68 distal to the splines 72, 80 that further limits lateral play between the two pole sections 34, 38.

In addition, the locking washer 92 further acts to engage the upper and lower pole sections 34, 38 together in a locking relationship. As noted, the locking washer 92 is affixed to the distal neck or end of the upper pole section 38 by means of a fastener 96, such as a screw, bolt or other threaded fastener. The orientation of the locking washer 92 is such that the insertion of the upper pole section 38 into the mating hole 60 of the lower pole section 34 is unidirectional. The diameter of the locking washer 92 is greater than the narrowed diameter of mating hole 68 and therefore the sharp edges of the serrated sections 98 penetrate the inner diametrical wall of the insert portion 64 as the upper pole section 38 is axially inserted into the lower pole section 34. The natural concave shape of the locking washer 92 prevents removal from the lower pole section 34, thereby preventing the mating pole sections 34, 38 from being separated and permanently locking them in direct engagement.

Referring to FIG. 4, the lower end of the lower pole section 34 and the wheeled base 24 of the herein described mobile stand 20 also can be assembled using a secured locking assembled arrangement akin to that depicted in FIGS. 2 and 3. Similar parts are herein labeled with the same reference numerals for the sake of clarity. In this instance, the lower end of the lower pole section 34 includes an arrangement similar to that of the lower end of the upper pole section 38, FIG. 2. That is, the lower pole section 34 includes a male spline 80 having a series of axially disposed and tapered teeth, an adjacent distal extending cylindrical section 88 and a locking washer 92 attached to a distal neck or end of the pole section, respectively.

According to this exemplary embodiment, the wheeled base 24 includes a hollowed vertically extending shaft 102 that is provided within the center stanchion 29 of the base. This shaft is defined by a mating hole or opening 106 that is sized to receive the lower end of the lower pole section 34, the shaft further including a complementary female spline 110. The opening 106 of the extending shaft 102 is contoured and is defined by a diameter that decreases or narrows in relation to the open end thereof. Preferably, the male spline 80 includes a set of axially extending teeth 84 that are tapered along their length, like those previously discussed and shown in FIGS. 2, 3 for engagement within complementary tapered slots formed within the female spline 110. As in the preceding, axial engagement of the lower end of the pole section 34 into the mating hole 106 of the base shaft 102 causes the extending section 88 of the pole section end to engage therewith, including the locking washer 92, the latter being permanently secured to the extending section 88 by a threaded fastener 96 that is attached to the distal neck, the locking washer including a plurality of serrated portions that each engage the interior diametrical wall of the shaft 106 when the pole section 34 is axially engaged with the base 24. The engagement between the splines 72, 80, reduces lateral play wherein the pole section 34 becomes permanently and stably secured to the base 24.

PARTS LIST FOR FIGS. 1-4

20 mobile stand
24 base
26 base legs
27 wheels
28 casters
29 center stanchion or post
30 support pole member
34 lower pole section
38 upper pole section
44 medical instrument
48 support basket
52 bracket
56 fasteners
60 mating hole or opening
64 insert portion
68 mating hole, narrowed
72 female spline
74 slots
77 annular sections
80 male spline
84 teeth, tapered
85 annular sections
86 proximal end
87 distal end
88 extending cylindrical section
92 serrated locking washer
96 fastener
98 serrated sections
102 hollowed shaft
106 mating hole or opening
110 female spline It will be readily apparent that other modifications and variations are possible that include the inventive concepts according to this application. For example, it should be noted that the splines could be reversibly located; that is, the male spline could be situated on the lower pole section and the female spline situated along the upper pole section of the pole member.

The invention claimed is:

1. A stand, said stand comprising:
a wheeled base;
a pole assembly attached to said base, said pole assembly including a lower pole section and an upper pole section, said lower pole section including a hollow end having a female spline disposed therein for engaging a corresponding male spline in the upper pole section; and
a locking element for engaging the hollow end of said lower pole section when inserted a predetermined distance therein,
wherein the male spline and the locking element are separated by an extending cylindrical section.

2. A stand as recited in claim 1, wherein said locking element is a serrated locking washer, said washer having a diameter that is larger than a diameter of said lower pole section.

3. A stand as recited in claim 1, wherein said lower pole section includes a tapered opening.

4. A stand as recited in claim 3, wherein said teeth of said male spline taper axially from a minimum at a distal end to a maximum at a proximal end.

5. A stand as recited in claim 1, wherein said wheeled base is attached to said pole assembly, said wheeled base including said lower pole section.

6. A method for manufacturing a pole assembly, said method including the steps of:
providing a lower pole member with a hollow first end;
providing said hollow first end with a first spline;
providing an upper pole member having a first end;
providing a second spline complementary to said first spline at said first end, wherein one of said splines includes a plurality of axial teeth and the other of said splines includes a plurality of slots, each of said slots being sized to receive said teeth in an interference fit;
providing a locking element, said locking element being attached to the first end of said upper pole member and configured to engage the hollow end of said lower pole member,
wherein the second spline of the first end and the locking element are separated by an extending cylindrical section;
providing a base, said base including a center stanchion with a hollow end;
providing said hollow end of said stanchion with a third spline; and
providing said lower pole member with a second end, said second end having a fourth spline and in which each of said third and fourth splines are complementary.

7. A method as recited in claim 6, wherein said locking element is a serrated washer.

* * * * *